2,789,096

THERMOSETTING PRESSURE-SENSITIVE ADHESIVE

Arthur J. Bruno and Joseph Dec, Martinsville, N. J., assignors to Johns-Manville Corporation, New York, N. Y., a corporation of New York No Drawing. Application December 31, 1953, Serial No. 401,717

12 Claims. (Cl. 260—4)

This invention relates to a thermosetting pressure-sensitive adhesive material, and, more particularly, to an adhesive sheet having a backing coated on one or both sides with a layer of such an adhesive.

Tapes having pressure-sensitive adhesive coatings thereon have found wide application in industry, particularly in the fields involving wrapping of conduits, cables and the like, and in providing electrical insulation for joints, conductor splices, etc. Conventional tacky pressure-sensitive adhesives have been fully satisfactory for most purposes but suffer the undesirable characteristic of having relatively poor resistance to elevated temperatures, oil, and long exposure to water. These disadvantages are due to the fact that such adhesives are conventionally compounded from a mixture of rubber and a tackifying resin, both of which materials are thermoplastic and change in character with heat and are adversely affected to varying degrees by oils and water. Hence, while the tapes have excellent characteristics of tackiness nad adhesion enabling their easy application and the formation of a firm bond, the bond will often be damaged when exposed to elevated temperatures, water and oils.

Accordingly, it is an object of this invention to provide a pressure-sensitive adhesive which is tacky and presure-sensitive, but which may be treated to render it resistant to physical change at elevated temperatures.

It is a further and more specific object of this invention to provide a backing sheet coated with a tacky and pressure-sensitive adhesive which is capable of easy application and of forming a strong bond to the surface to which it is applied, which adhesive is not substantially adversely affected by change in temperature, or long exposure to oils and water.

With the above and other objects and features in view, the invention consists in the improved pressure-sensitive adhesive and backing sheet coated therewith hereinafter described and more particularly defined in the appended claims.

The objects of this invention are obtained by providing a pressure-sensitive adhesive composition which is tacky and pressure-sensitive when formulated, but which when exposed to elevated temperatures is rapidly transformed to a permanently non-tacky bonding material. The adhesive is suitable for coating one or both sides of conventional pressure-sensitive tape backing materials as, for example, paper, cloth, suitable synthetic polymeric material, such as a polyester film (e. g., Mylar). As will become apparent hereinafter, the backing sheet should be capable of withstanding temperatures sufficient to convert the adhesive of this invention to its non-tacky state. Since the invention is of particular utility in the formation of a pressure-sensitive tape for use in electrical insulation on splices, joints, and the like, a cloth backing of asbestos or glass fiber is employed.

In order to obtain the desired results of this invention, the pressure-sensitive adhesive employed essentially comprises a natural or synthetic rubber, a tackifying resin compatible with the rubber employed, a polyvinyl butyral resin having a low hydroxyl content, and a thermosetting alkylated melamine aldehyde resin compatible with the other components of the system. Preferably, a reinforcing pigment is included in the composition to increase the cohesive strength of the adhesive and to impart the desired color thereto, and sufficient antioxidants and preservatives are added as required by the particular rubber used.

Any conventional rubbers for adhesives may be used as, for example, smoked sheet, wild rubber, latex crepe, reclaimed rubber, scrap rubber, and equivalent synthetic rubbers, such as butadiene-styrene, etc., and combinations of such rubbers. A mixture of smoked sheet and butadiene-styrene (GR–S) rubbers is employed in the preferred embodiment of the invention. Suitable antioxidants such as substituted naphthylamines and hydroquinones are added to the composition in amounts dependent upon the rubber used.

Exemplary of thermosoftening or tackifying resins compatible with the above-mentioned rubbers are rosin, ester gum, hydrogenated rosin, hydrogenated rosin esters, coumarone-indene resins, and polyterpene resins (Piccolyte resins).

The polyvinyl butyral resin employed in the composition should contain vinyl alcohol units in the polymer in amount less than approximately 20%, and preferably not more than 15% by weight. Polyvinyl butyral resins of substantially higher hydroxyl content have not been found suitable due to problems of their compatibility with the other components of the system and particularly with solvents of the type conventionally employed in the formulation of such pressure-sensitive adhesives. Exemplary of a suitable polyvinyl butyral resin is Butvar B–76 marketed by the Monsanto Chemical Company. The vinyl alcohol content of this resin is approximately 13% by weight.

An alkylated melamine aldehyde resin is employed in the composition in order that the adhesive may be rendered non-tacky by a heating procedure. Preferably, a butylated melamine formaldehyde resin, such as Monsanto's Resimene 882, is employed, but melamine aldehyde resins substituted with similar short-chain alkyl groups may be used.

A reinforcing pigment is normally included in the adhesive composition to increase the cohesive strength thereof and to allow modification of the color of the formulation. A neutral or somewhat acidic pigment should be used in order to insure that the curing characteristics of the alkylated melamine aldehyde resin are not adversely affected due to alkalinity. Examples of suitable pigments and fillers are titanium dioxide, barytes, carbon black, etc.

In order to obtain proper characteristics in the adhesive composition, definite proportions of the various ingredients should be used. The amount of tackifying resin should be sufficient to plasticize the rubber and render it tacky or adhesive. Normally, 25 to 100 parts by weight of resin per 100 parts of rubber are used. The polyvinyl butyral should be present in amount approximately 40 to 100 parts per 100 parts of rubber. Relatively small amounts of alkylated melamine aldehyde resin are used, with amounts approximately 10 to 40 parts per 100 parts of rubber being satisfactory. Pigments or fillers, while not necessary in the composition in every case, may be present in amount up to approximately 150 parts per 100 parts of rubber.

While any suitable conventional means may be used to formulate the adhesive, it is preferred that the rubber, pigment and antioxidant initially be combined on a rubber mill or the like to form a base. If desired, the rubber may be broken down to a slight extent on the mill before the pigment is added. The thus formed base may then be placed in a sigma blade mixer or other suitable churn, with the resins and a suitable solvent and mixed until a homogeneous product is formed. Rubber-resin solvents conventionally used to enable spreading of such a pressure-sensitive adhesive may be employed, e. g., toluene, xylene, benzene, etc. Due to the presence in the composition of the melamine resin, it is advantageous that the solvent content include a small quantity of an active amino-resin solvent, such as butyl alcohol. The resultant solution of the adhesive may then be spread on any suitable backing material. Evaporation of the solvent yields a tacky pressure-sensitive coating on the backing, which coating can be subsequently cured by exposing the adhesive to elevated temperatures, as for example, 200–350° F.

The following is an example of a thermosetting pressure-sensitive adhesive and a tape formed employing such an adhesive and their general method of preparation. It is understood, of course, that the particular compositions and methods recited are exemplary and are not to be considered to limit the invention to the particular compositions and proportions outlined. The proportions indicated in the example are by weight.

A solution of a pressure-sensitive adhesive was formed from a composition of:

| | |
|---|---|
| Butadiene-styrene (GR-S) | 50 |
| Smoked sheet | 50 |
| Antioxidant (Santovar O) | 1 |
| Titanium dioxide | 50 |
| Polyvinyl butyral resin (Butvar B76) | 60 |
| Butylated melamine formaldehyde resin (Resimene 882) | 30 |
| Polyterpene resins (Piccolyte 8–115, 8–85) | 100 |
| Toluene | 300 |
| Butanol | 25 | by combining the rubber, pigment and antioxidant on a rubber mill to form a base. This base was then placed in a Baker-Perkins mixer with the tackifying polyterpene resins, the polyvinyl butyral resins, the butylated melamine formaldehyde resins, and both solvents and mixed until a homogeneous solution was formed. The resultant solution was then spread on a cloth formed of glass fibers, and the solvent evaporated to yield a tacky pressure-sensitive adhesive on the backing. When applied in position, the pressure-sensitive tape adhered well to the surface against which it was applied, and upon heating to a temperature of approximately 300° F., the adhesive cured to a non-tacky stage which was not thereafter substantially adversely affected by changes in temperature or exposure to oil or water.

While the pressure-sensitive adhesive disclosed herein has been indicated as particular value in the formation of a pressure-sensitive tape for use in wrapping cables, conduits, and the like, and in the formation of splices and joints in electrical conductors, it will be appreciated that the adhesive and backing sheet coated with the adhesive may be used for many purposes. For example, a backing sheet may be coated on both sides with the adhesive and used for joining together materials of various natures. For such a use, there is preferred an open-weave cloth which, in effect, serves the function of reinforcing the adhesive after its cure. Many other uses of the tape formed in accordance with this invention become apparent when consideration is given to the fact that the product has the advantage of the pressure-sensitive adhesive characteristics initially but loses the disadvantages of such an adhesive when cured to a thermally stable stage.

It will be understood that the details given herein are for the purpose of illustration, not restriction, and that variations within the spirit of the invention are intended to be included in the scope of the appended claims. In the claims the parts indicated are by weight.

What we claim is:

1. A pressure-sensitive adhesive composition comprising a rubbery component comprised of a material from the group consisting of natural rubbers, rubbery butadiene-styrene copolymers and combinations thereof, a tackifying resin in amount approximately 25 to 100 parts per 100 parts of the rubbery component, a polyvinyl butyral resin having a vinyl alcohol content not greater than approximately 15% by weight in amount approximately 40 to 100 parts per 100 parts of the rubbery component and a thermosetting alkylated melamine aldehyde resin in amount approximately 10 to 40 parts per 100 parts of the rubbery component.

2. An adhesive composition according to claim 1 which adhesive composition contains a reinforcing pigment in amount up to approximately 150 parts per 100 parts of the rubbery component.

3. A pressure-sensitive adhesive composition comprising a rubbery component comprised of a material from the group consisting of natural rubbers, rubbery butadiene-styrene copolymers and combinations thereof, a tackifying resin in amount approximately 25 to 100 parts per 100 parts of the rubbery component, a polyvinyl butyral resin having a vinyl alcohol content not greater than approximately 20% by weight in amount approximately 40 to 100 parts per 100 parts of the rubbery component, and a thermosetting alkylated melamine aldehyde resin in amount approximately 10 to 40 parts per 100 parts of the rubbery component.

4. An adhesive composition according to claim 3 which adhesive composition contains a reinforcing pigment having a neutral to acidic characteristic in amount up to approximately 150 parts per 100 parts of the rubbery component.

5. A pressure-sensitive adhesive composition comprising a natural rubber, a tackifying resin in amount approximately 25 to 100 parts per 100 parts of the rubber, a polyvinyl butyral resin having a vinyl alcohol content not greater than approximately 20% by weight in amount approximately 40 to 100 parts per 100 parts of the rubber, and a thermosetting alkylated melamine aldehyde resin in amount approximately 10 to 40 parts per 100 parts of the rubber.

6. An adhesive composition according to claim 5 which adhesive composition contains a reinforcing pigment in amount up to approximately 150 parts per 100 parts of the rubber.

7. A pressure-sensitive adhesive composition comprising a rubbery butadiene-styrene copolymer, a tackifying resin in amount approximately 25 to 100 parts per 100 parts of the butadiene-styrene, a polyvinyl butyral resin having a vinyl alcohol content not greater than approximately 20% by weight in amount approximately 40 to 100 parts per 100 parts of the butadiene-styrene, and a thermosetting alkylated melamine aldehyde resin in amount approximately 10 to 40 parts per 100 parts of the butadiene-styrene.

8. An adhesive composition according to claim 7 which adhesive composition contains a reinforcing pigment in amount up to approximately 150 parts per 100 parts of the butadiene-styrene.

9. A pressure-sensitive adhesive composition comprising a rubbery component comprised of a material from the group consisting of natural rubbers, rubbery butadiene-styrene copolymers and combinations thereof, a tackifying resin from the group consisting of rosin, ester gum, hydrogenated rosin, hydrogenated rosin esters, coumarone-indene resins and polyterpene resins in amount approximately 25 to 100 parts per 100 parts of the rubbery component, a polyvinyl butyral resin having a vinyl alcohol content not greater than approximately 20% by weight in amount approximately 40 to 100 parts per 100 parts of the rubbery component, and a thermosetting alkylated melamine aldehyde resin in amount approximately 10 to 40 parts per 100 parts of the rubbery component.

10. An adhesive composition according to claim 9 which adhesive composition contains a reinforcing pigment having a neutral to acidic characteristic in amount up to approximately 150 parts per 100 parts of the rubbery component.

11. A pressure-sensitive adhesive composition comprising a rubbery component comprised of a material from the group consisting of natural rubbers, rubbery butadiene-styrene copolymers and combinations theerof, a tackifying resin from the group consisting of rosin, ester gum, hydrogenated rosin, hydrogenated rosin esters, coumarone-indene resins and polyterpene resins in amount approximately 25 to 100 parts per 100 parts of the rubbery component, a polyvinyl butyral resin having a vinyl alcohol content not greater than approximately 15% by weight in amount approximately 40 to 100 parts per 100 parts of the rubbery component, and a thermosetting alkylated melamine aldehyde resin in amount approximately 10 to 40 parts per 100 parts of the rubbery component.

12. An adhesive composition according to claim 11 which adhesive composition contains a reinforcing pigment having a neutral to acidic characteristic in amount up to approximately 150 parts per 100 parts of the rubbery component.

References Cited in the file of this patent

UNITED STATES PATENTS

| | | |
|---|---|---|
| 2,453,308 | Dunlop | Nov. 9, 1948 |
| 2,728,687 | Huerre | Dec. 27, 1955 |